United States Patent
Jung

(12) 
(10) Patent No.: US 8,991,132 B2
(45) Date of Patent: Mar. 31, 2015

(54) CONCRETE REINFORCING MEMBERS, AND ASSOCIATED METHODS OF MANUFACTURE AND USE

(75) Inventor: Sukho Jung, Sungnam (KR)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/809,884

(22) PCT Filed: Dec. 10, 2010

(86) PCT No.: PCT/US2010/059867
§ 371 (c)(1),
(2), (4) Date: Jan. 11, 2013

(87) PCT Pub. No.: WO2012/078170
PCT Pub. Date: Jun. 14, 2012

(65) Prior Publication Data
US 2013/0167755 A1    Jul. 4, 2013

(51) Int. Cl.
*E04H 12/00* (2006.01)
*B21C 37/12* (2006.01)
*E04C 5/02* (2006.01)
*C04B 14/00* (2006.01)

(52) U.S. Cl.
CPC ............ *B21C 37/121* (2013.01); *E04C 5/02* (2013.01); *C04B 14/005* (2013.01)
USPC ............ 52/649.1; 52/843; 52/857; 29/897.34

(58) Field of Classification Search
CPC ............ E04C 3/07; E04C 2003/043; E04C 2003/0421; E04C 3/32; E04C 2003/0439; E04C 5/02; B21C 37/121; C04B 14/005
USPC ............ 52/831, 836, 843, 852, 857, 742.14, 52/414, 649.1, 649.5; 29/897.34, 897.33, 29/897.3; 72/146
See application file for complete search history.

(56) References Cited

U.S. PATENT DOCUMENTS

| 400,931 | A | | 4/1889 | McCloud | |
|---|---|---|---|---|---|
| 1,104,714 | A | * | 7/1914 | Sonnier | 52/857 |
| 1,685,886 | A | | 10/1928 | Speller | |
| 2,677,765 | A | * | 5/1954 | Collins et al. | 52/836 |

(Continued)

FOREIGN PATENT DOCUMENTS

GB    1035700    7/1966

OTHER PUBLICATIONS

International Search Report and Written Opinion for PCT/US2010/059867 filed Dec. 10, 2010, 9 pages, mailing date: Jun. 1, 2011.

*Primary Examiner* — Brian Glessner
*Assistant Examiner* — Brian D Mattei
(74) *Attorney, Agent, or Firm* — Dorsey & Whitney LLP

(57) ABSTRACT

Concrete reinforcing members having rolled cross sections, and methods for manufacturing and using such reinforcing members in concrete construction are disclosed herein. In one embodiment, a concrete reinforcing member is formed from a piece of metal having a first elongate edge portion spaced apart from a second elongate edge portion. The piece of metal further includes an inner surface portion extending between the first and second edge portions, and an outer surface portion extending between the first and second edge portions. In this embodiment, the piece of metal is rolled about a longitudinal axis in an overlapping fashion into coiled or spiral cross-sectional shape.

11 Claims, 4 Drawing Sheets

(56) References Cited

U.S. PATENT DOCUMENTS

| | | | |
|---|---|---|---|
| 3,001,284 A * | 9/1961 | Marotz | 83/611 |
| 3,757,626 A * | 9/1973 | Kulp | 83/542 |
| 4,119,764 A | 10/1978 | Mizuma et al. | |
| 4,460,118 A * | 7/1984 | Ataka et al. | 228/146 |
| 4,694,623 A | 9/1987 | Herrmann | |
| 5,548,937 A * | 8/1996 | Shimonohara | 52/586.1 |
| 5,806,296 A | 9/1998 | Kaneko et al. | |
| 2009/0178356 A1 * | 7/2009 | Baumann | 52/414 |
| 2009/0184230 A1 * | 7/2009 | Carney, Jr. | 249/19 |

\* cited by examiner

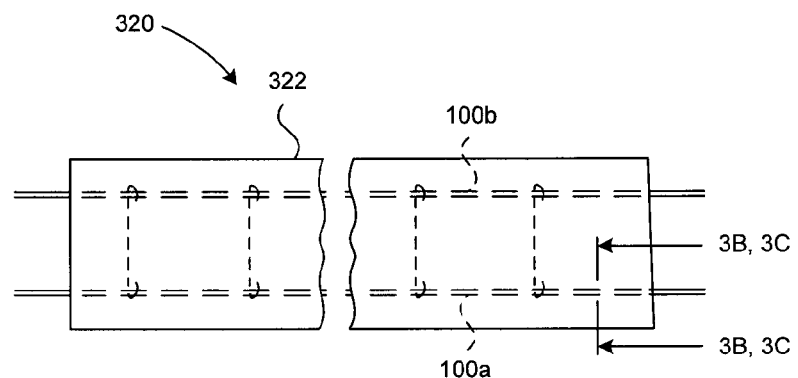
FIG. 3A
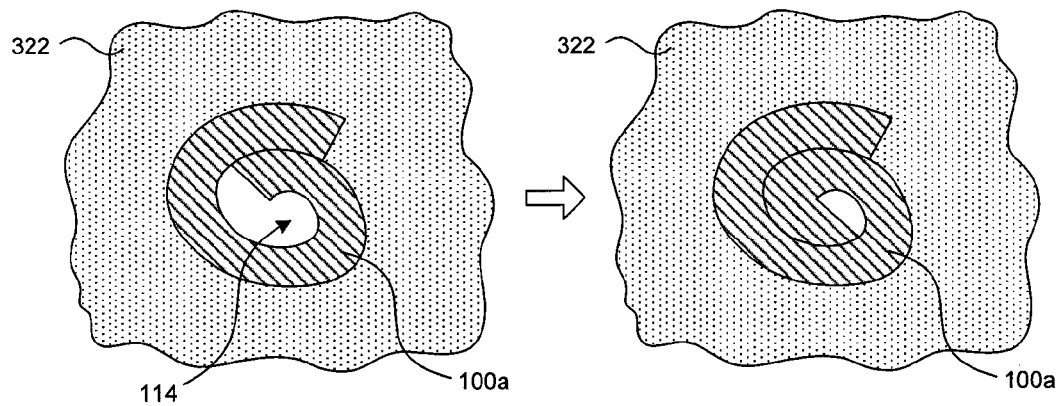
FIG. 3B  FIG. 3C

CONCRETE REINFORCING MEMBERS, AND ASSOCIATED METHODS OF MANUFACTURE AND USE

TECHNICAL FIELD

The present disclosure is directed generally to reinforced concrete structures and, more particularly, to reinforcing members for use with such structures.

BACKGROUND

Concrete is generally strong in compression but weak in tension. Accordingly, conventional concrete structures typically include steel reinforcing bars (i.e., "rebar") to increase the tensile strength of the structure. Conventional reinforcing bar has a round cross section with a number of ribs or ridges extending around the outside of the bar to help the concrete grip the bar.

Concrete is a mixture of cement and stone aggregate consisting of sand, gravel, crushed stone, etc. Using sea sand for aggregate can lead to corrosion of the reinforcing bar caused by salt in the sand. Similar corrosion can occur if the concrete structure is installed in the ocean. When the steel corrodes, the oxidation products cause the reinforcing bar to expand, which can lead to stress cracks in the concrete. These cracks allow oxygen to permeate the concrete and accelerate the corrosion, which not only reduces the strength of the steel but also leads to further expansion and cracking of the concrete. In addition, expansion of the steel bar can break the grip of the concrete, causing the concrete to fall away from the structure. Conventional methods for addressing corrosion problems include dipping the reinforcing bar into a suitable epoxy coating, galvanizing the steel bar, and/or using stainless steel bar. Each of these methods, however, can add considerable cost to the reinforcing bar.

Conventional concrete reinforcing bar is typically provided in standard lengths, such as eight meters. One disadvantage of these lengths is that transporting the reinforcing bar typically requires a special delivery vehicle. A further disadvantage is that a reinforcing bar typically requires a special delivery vehicle. A further disadvantage is that a lot of material may be wasted as remnant pieces are created during the cutting and fitting of the construction process. These remnant pieces are often too short to be of any use and are frequently discarded. A further disadvantage of conventional reinforcing bar is that when lengths longer than standard are required, two or more bars must be joined together to provide the desired length. Accordingly, it would be desirable to provide a concrete reinforcement member that has favorable corrosion characteristics, is easy to transport and store, and reduces raw material waste.

SUMMARY

One aspect of the disclosure is directed to a concrete reinforcing member that includes a piece of metal having a first elongate edge portion spaced apart from a second elongate edge portion. The piece of metal includes inner and outer surface portions extending between the first and second edge portions. The piece of metal is rolled or otherwise formed so that the inner and outer surface portions spiral outwardly about a longitudinal axis of the reinforcing member.

Another aspect of the disclosure is directed to a concrete structure that includes at least one reinforcing member embedded in concrete. The reinforcing member includes an elongate strip of metal rolled over on itself about a longitudinal axis to form a generally round bar.

A further aspect of the disclosure is directed to a method of manufacturing a concrete reinforcing member. The method includes providing an elongate, flat strip of metal having a first lengthwise edge spaced apart from a second lengthwise edge. The method further includes rolling the flat strip of metal about a longitudinal axis that extends parallel to the first and second lengthwise edges.

Yet another aspect of the disclosure is directed to a method of manufacturing a concrete structure. The method includes rolling a flat strip of metal about a longitudinal axis to form an elongate bar, and arranging the elongate bar in a concrete form. The method further includes pouring concrete into the form around the elongate bar.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 3A is a side view of a concrete structure that includes the reinforcing member of FIGS. 1A and 1B, and FIGS. 3B and 3C are enlarged cross-sectional end views of a portion of the concrete structure illustrating the behavior of the reinforcing member as it corrodes.

DETAILED DESCRIPTION

The present disclosure describes various embodiments of structural reinforcing members, such as steel reinforcing members for use in reinforced concrete structures. In one embodiment, a concrete reinforcing member is formed from an elongate strip of metal having opposing lengthwise edges. The metal can be rolled about a longitudinal axis in an overlapping fashion to form a bar in which the lengthwise edges remain generally straight and parallel to the longitudinal axis. As compared to conventional concrete reinforcing bars having round cross sections, this "rolled" construction results in less outward expansion of the reinforcing member as it corrodes, which in turn causes less cracking in the adjacent concrete.

Certain details are set forth in the following description and in FIGS. 1A-4 to provide a thorough understanding of various embodiments of the disclosure. Other details describing well-known structures and systems often associated with concrete structures, concrete reinforcing bar, and concrete and steel manufacturing techniques have not been set forth in the following disclosure to avoid unnecessarily obscuring the description of the various embodiments of the disclosure.

Many of the details, dimensions, angles and other features shown in the Figures are merely illustrative of particular embodiments of the disclosure. Accordingly, other embodiments can have other details, dimensions, angles and features without departing from the spirit or scope of the present disclosure. In addition, those of ordinary skill in the art will appreciate that further embodiments of the present disclosure can be practiced without several of the details described below.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

Figure 1A:
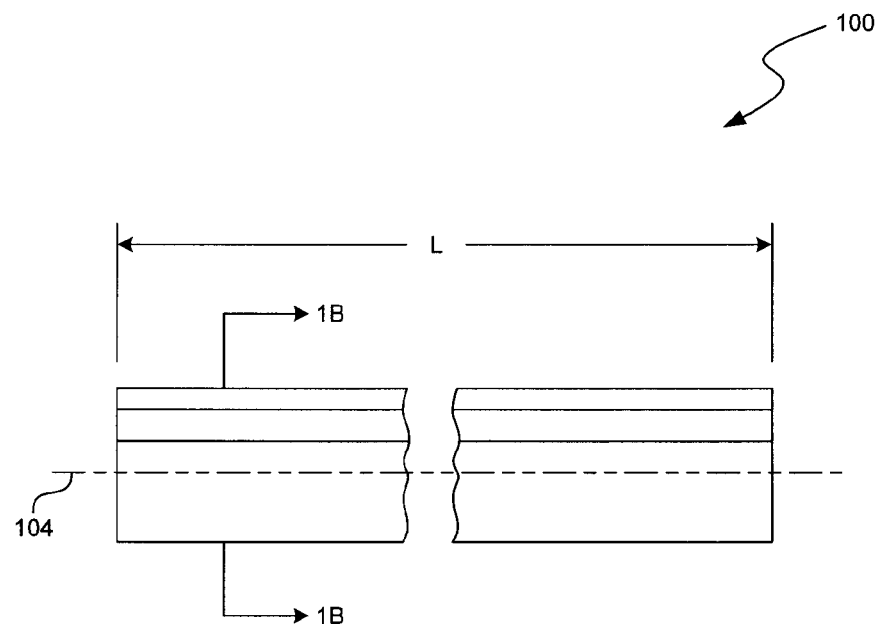
FIGS. 1A and 1B are side and end cross-sectional views, respectively, of a concrete reinforcing member configured in accordance with an embodiment of the disclosure.
Figure 1B:
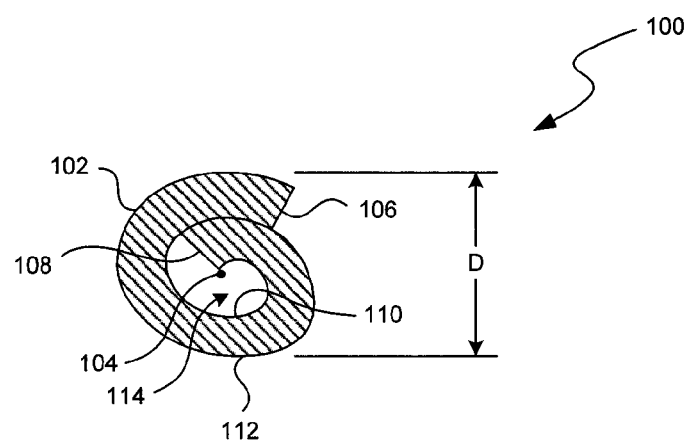

FIG. 1A is a side view of a concrete reinforcing member 100 configured in accordance with an embodiment of the disclosure, and FIG. 1B is an end cross-sectional view taken along line 1B-1B in FIG. 1A. Referring to FIGS. 1A and 1B together, in the illustrated embodiment the reinforcing member 100 is formed from a strip of material 102 that is rolled or otherwise formed in an overlapping manner about a longitudinal axis 104 to produce a generally round, elongate member having an outer cross-sectional dimension D and an overall length L. The material 102 has a first edge portion 106 spaced apart from a second edge portion 108. An inner surface portion 110 and an outer surface portion 112 extend outwardly from the second edge portion 108 in a spiral path around an open interior volume 114. The material 102 is formed so that the first edge portion 106 and the second edge portion 108 remain at least generally parallel to the longitudinal axis 104. Moreover, in this configuration the second edge portion 108 is enclosed within the outer surface 112, and at least a portion of the outer surface 112 may contact a portion of the inner surface 110 along the length of the reinforcing member 100 so that little or no gap exists between the exterior of the reinforcing member 100 and the interior volume 114.

The strip of material 102 can be composed of various types of known steels that are suitable for use in construction and, more particularly, in concrete construction. Such steels can include, for example, ASTM A82 and ASTM A496. ASTM A615 steel bar Grade 275, Grade 420, or Grade 520 can also be used, as can other types of mild and carbon steels. In other embodiments, however, the material 102 can be comprised of a wide variety of other suitable metals known to those of ordinary skill in the art.

Figure 2A:
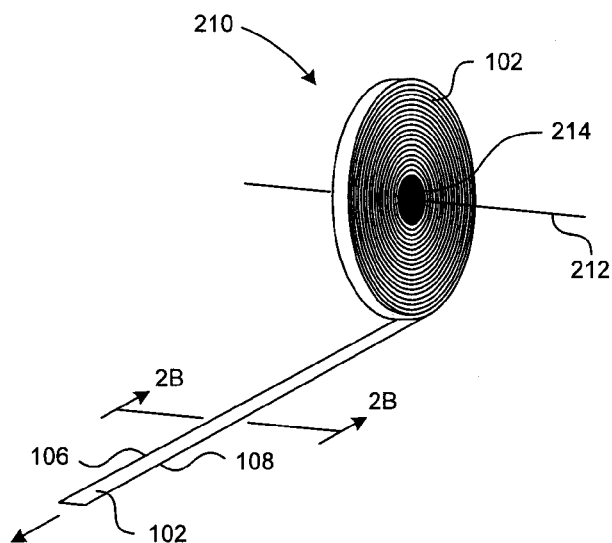
FIG. 2A is an isometric view of a roll of material for forming a reinforcing member in accordance with an embodiment of the disclosure.
Figure 2B:
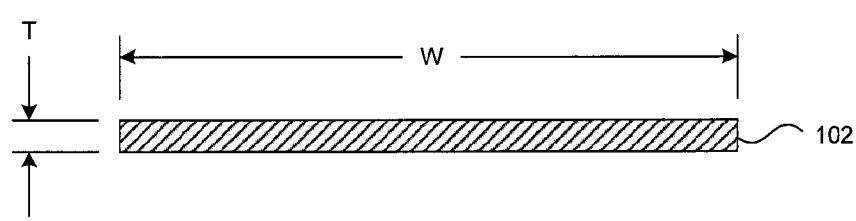
FIG. 2B is an enlarged cross-sectional view of the reinforcing member material.
Figure 2C:
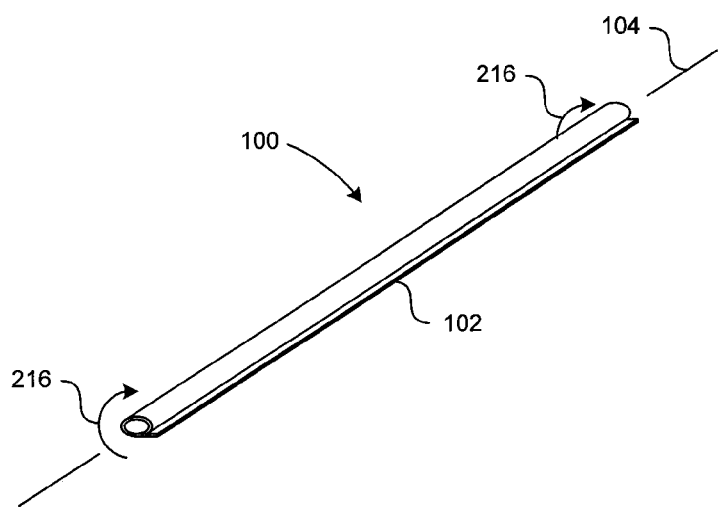
FIG. 2C is an isometric view illustrating a process for forming the material into a reinforcing member in accordance with an embodiment of the disclosure.

FIGS. 2A-2C are a series of views illustrating various stages in a method of forming the material 102 into the reinforcing member 100 at a construction site or other location in accordance with an embodiment of the disclosure. FIG. 2A, for example, is an isometric view of the material 102 wound about a spool 214 oriented along a transverse axis 212. Carrying the material 102 on the spool 214 facilitates relatively easy transportation and storage of the material 102 prior to usage. When it is desired to form a portion of the material 102 into a corresponding reinforcing member 100, a desired length of the material 102 is pulled from the spool 214 and cut to the desired length.

As shown in FIG. 2B, the material 102 has a generally rectangular cross-sectional shape prior to forming. More specifically, the material 102 can have a cross-sectional width W and a cross-sectional thickness T. In one embodiment, the width W can be from about 30 millimeters to about 80 millimeters, or about 50 millimeters, and the thickness T can be from about 1 millimeter to about 5 millimeters, or about 3 millimeters. In other embodiments, however, the width W and the thickness T can have other dimensions as desired to suit particular applications.

Referring next to FIG. 2C, after the desired length of material has been removed from the spool 214, the material 102 can be rolled or folded about the longitudinal axis 104 to form a generally round bar. The material 102 can be rolled or folded using any number of suitable machines and methods known in the art. Such machines can include relatively small rolling machines that can be transported to and installed at a particular construction site. In other embodiments, the reinforcing member 100 can be formed into the desired spiral or coil cross-sectional shape using other techniques known in the art, including extrusion techniques that extrude the reinforcing member 100 in the coil or rolled shape. Moreover, in some embodiments it may also be advantageous to form ribs or notches on the exterior surface of the reinforcing member during or after the folding or rolling process using suitable methods known in the art. Such methods can include, for example, pressing grooves or other features into the exterior surface of the material 102 during the rolling process, or cutting or grinding notches or other features in the exterior surface after rolling. These features can enhance the ability of the concrete to grip the reinforcing member in use. In other embodiments, such surface features can be formed on the material 102 prior to rolling or folding the material into a bar.

One of many advantages of the rolled reinforcing members described herein is that the material 102 can be stored on the spool 214, and the desired length of material can be easily dispensed from the spool 214 and cut to length just prior to forming. This eliminates the problem of transporting long lengths of reinforcing bar to a construction site, and reduces waste resulting from remnant pieces not being used in construction.

FIG. 3A is a side view of a concrete structure 320 having multiple reinforcing members 100 (identified individually as reinforcing members 100a and 100b) configured in accordance with an embodiment of the disclosure. The concrete structure 320 can be any number of different concrete structures (e.g., columns, beams, etc.) used in bridges, highways, buildings, etc., and the reinforcing members 100 can be arranged in the concrete structure 320 in accordance with conventional concrete construction techniques known in the art.

FIGS. 3B and 3C are enlarged end cross-sectional views taken along lines 3B-3B and 3C-3C in FIG. 3A. More specifically, FIG. 3B is a cross-sectional end view illustrating the reinforcing member 100a embedded in concrete 322 prior to any corrosion of the reinforcing member. FIG. 3C illustrates the same cross section of the concrete structure 320 after the reinforcing member 100a has expanded due to corrosion. As shown in FIG. 3B, the interior volume 114 of the reinforcing member 100a is initially relatively open or hollow. The interior volume 114 is relatively open because the reinforcing member 100a is formed so that little or no gap exists between the overlapping portions of the material 102. As a consequence, very little of the concrete 322 flows into the interior volume 114 during casting. As a result, when the reinforcing member 100a begins to expand due to corrosion, the material 102 can expand into the open volume 114 as shown in FIG. 3C, without causing the reinforcing member 100a to expand appreciably outward. Accordingly, by expanding inwardly and filling up the interior volume 114, the reinforcing member 100a tends to put less outward pressure on the concrete 322 as compared to conventional solid rebar. This reduction in stress leads to a reduction in cracking of the concrete 322 and separation of the concrete from the reinforcing member 100a. Moreover, it is expected that the somewhat irregular cross-sectional shape of the reinforcing member 100a can improve the ability of the concrete 322 to bond and grip the reinforcing member 100a.

Figure 4:
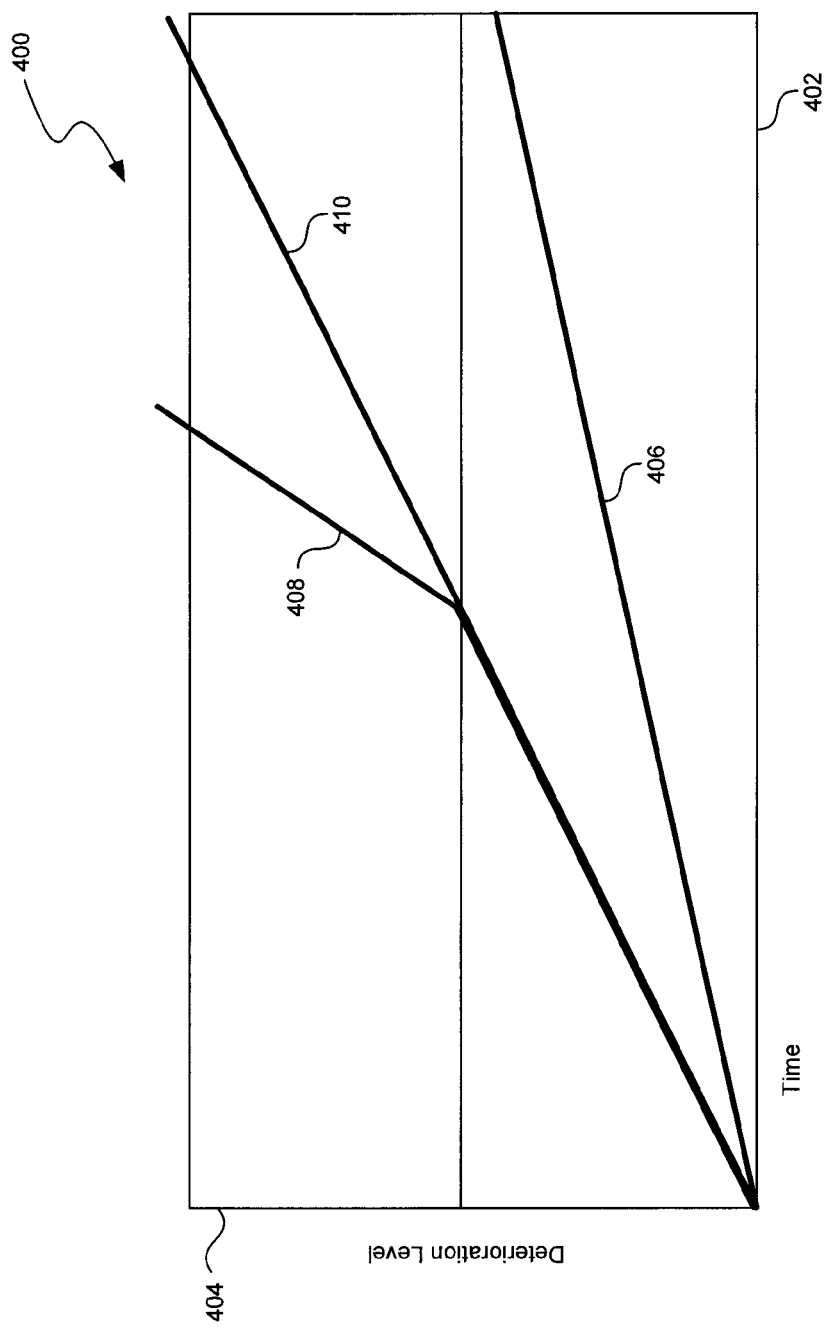
FIG. 4 is a graph illustrating the improved deterioration characteristics of reinforced concrete structures using reinforcing members configured in accordance with the present disclosure.

FIG. 4 illustrates a representative graph 400 that measures concrete deterioration level along a vertical axis 404 and time along a horizontal axis 402. A first line or plot 406 represents the behavior of a conventional concrete structure using conventional reinforcing bar that is not exposed to salt (e.g., salt in the concrete mixture). A second plot 408 illustrates the behavior of the same piece of reinforced concrete structure when the reinforcing bar is exposed to salt, and a third plot 410 illustrates the behavior of a reinforced concrete structure using the reinforcing member 100 described above in the presence of salt. As the graph 400 illustrates, using the reinforcing member 100 in concrete structures can significantly increase the life span of the concrete structure in a salt environment, as compared to use of conventional reinforcing bar.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

The following clauses define aspects of the disclosure:
1. A reinforcing member for use in concrete structures, the reinforcing member comprising:
   a piece of metal having—
      a first elongate edge portion spaced apart from a second elongate edge portion;
      an inner surface portion extending between the first and second edge portions; and
      an outer surface portion extending between the first and second edge portions, wherein the piece of metal has a cross-sectional shape in which the inner and outer surface portions spiral outwardly about a longitudinal axis of the reinforcing member.
2. The reinforcing member of clause 1 wherein the first and second edge portions are generally straight and extend parallel to the longitudinal axis.
3. The reinforcing member of any one of clauses 1 to 2 wherein the piece of metal defines an open inner volume extending generally parallel to the longitudinal axis.
4. The reinforcing member of any one of clauses 1 to 3 wherein the outer surface portion encloses the first edge portion.
5. The reinforcing member of any one of clauses 1 to 3 wherein the outer surface portion contacts the inner surface portion.
6. The reinforcing member of any one of clauses 1 to 5 wherein the piece of metal is coiled about the longitudinal axis.
7. The reinforcing member of any one of clauses 1 to 6 wherein the piece of metal includes steel.
8. A concrete structure comprising:
   concrete; and
   at least one reinforcing member embedded in the concrete, wherein the reinforcing member includes an elongate strip of metal rolled over on itself about a longitudinal axis.
9. The concrete structure of clause 8 wherein the elongate strip of metal is formed into a generally round bar.
10. The concrete structure of any one of clauses 8 to 9 wherein the elongate strip of metal has a generally constant cross-sectional thickness.
11. The concrete structure of any one of clauses 8 to 10 wherein the elongate strip of metal is formed into a generally spiral cross-sectional shape.
12. A method of manufacturing a concrete reinforcing member, the method comprising:
   providing an elongate, flat strip of metal, the flat strip of metal having a first lengthwise edge spaced apart from a second lengthwise edge; and
   rolling the flat strip of metal about a longitudinal axis, the longitudinal axis extending parallel to the first and second lengthwise edges.
13. The method of clause 12 wherein providing an elongate, flat strip of metal includes providing a strip of metal having a rectangular cross section.
14. The method of any one of clauses 12 to 13 wherein rolling the flat strip of metal about a longitudinal axis includes rolling the flat strip of metal into a spiral.
15. The method of any one of clauses 12 to 14 wherein rolling the flat strip of metal about a longitudinal axis includes forming the flat strip into a bar having a generally circular cross section.
16. The method of any one of clauses 12 to 15 wherein rolling the flat strip of metal about a longitudinal axis includes forming the flat strip into a bar having an exterior surface, and wherein the method further comprises forming at least one of notches or ribs in or on the exterior surface of the bar.
17. A method of manufacturing a concrete structure, the method comprising:
   rolling a flat strip of metal about a longitudinal axis to form an elongate bar;
   arranging the elongate bar in a concrete form; and
   pouring concrete into the form.
18. The method of clause 17 wherein rolling a flat strip of metal includes rolling a flat strip of metal having a first edge portion spaced apart from a second edge portion, wherein the first and second edge portions extend parallel to the longitudinal axis and remain generally straight after rolling.
19. The method of any one of clauses 17 to 18 wherein rolling the flat strip of metal about a longitudinal axis forms a generally round, elongate bar having a spiral cross-sectional shape.
20. The method of clause 17, further comprising maintaining an open volume within the elongate bar after pouring concrete into the form.
21. The method of any one of clauses 17 to 20 wherein the flat strip of metal is wound onto a spool prior to usage, and wherein the method further comprises:
   unrolling the flat strip of metal from the spool; and
   cutting the flat strip of metal to length, before rolling the flat strip of metal about the longitudinal axis.

I claim:
1. A reinforcing member for use in concrete structures, the reinforcing member comprising:
   a piece of metal having
      a first elongate edge portion spaced apart from a second elongate edge portion;
      an inner surface portion extending between the first and second edge portions, the inner surface defining an open volume within the piece of metal, the first elongate edge portion forming a first step on the inner surface, and the first elongate edge portion being movable relative to the second elongate edge portion and into the open volume; and an outer surface portion extending between the first and second edge portions, wherein the piece of metal has an irregular cross-sectional shape in which the inner and outer surface portions spiral outwardly about a longitudinal axis of the reinforcing member, the second elongate edge portion forming a second step on the outer surface.

2. The reinforcing member of claim 1 wherein the first and second edge portions are generally straight and extend parallel to the longitudinal axis.

3. The reinforcing member of claim 1 wherein the piece of metal defines an open inner volume extending generally parallel to the longitudinal axis.

4. The reinforcing member of claim 1 wherein the outer surface portion encloses the first edge portion.

5. The reinforcing member of claim 1 wherein the outer surface portion contacts the inner surface portion.

6. The reinforcing member of claim 1 wherein the piece of metal is coiled about the longitudinal axis.

7. The reinforcing member of claim 1 wherein the piece of metal includes steel.

8. A method of manufacturing a concrete reinforcing member, the method comprising:

providing an elongate, flat strip of metal, the flat strip of metal having a first lengthwise edge spaced apart from a second lengthwise edge; and rolling the flat strip of metal about a longitudinal axis, the longitudinal axis extending parallel to the first and second lengthwise edges in a manner that forms the concrete reinforcing member having an open volume therein and an irregular cross-sectional shape, the first lengthwise edge forming a first step in the open volume of the concrete reinforcing member, and the first lengthwise edge being movable relative to the second lengthwise edge in a manner that collapses the concrete reinforcing member into the open volume, and the second lengthwise edge portion forming a second step on an exterior of the concrete reinforcing member.

9. The method of claim 8 wherein providing an elongate, flat strip of metal includes providing a strip of metal having a rectangular cross section.

10. The method of claim 8 wherein rolling the flat strip of metal about a longitudinal axis includes rolling the flat strip of metal into a spiral.

11. The method of claim 8 wherein rolling the flat strip of metal about a longitudinal axis includes forming the flat strip into a bar having a generally circular cross section.

* * * * *

UNITED STATES PATENT AND TRADEMARK OFFICE
CERTIFICATE OF CORRECTION

| | | |
|---|---|---|
| PATENT NO. | : 8,991,132 B2 | Page 1 of 1 |
| APPLICATION NO. | : 13/809884 | |
| DATED | : March 31, 2015 | |
| INVENTOR(S) | : Jung | |

It is certified that error appears in the above-identified patent and that said Letters Patent is hereby corrected as shown below:

On the Title Page, in Item (75), under "Inventor", in Column 1, Line 1, delete "Sungnam" and insert -- Seongnam --, therefor.

In the Specification

In Column 1, below Title, insert -- CROSS-REFERENCE TO RELATED APPLICATION
This application is a U.S. national stage filing under 35 U.S.C. §371 of International Application No. PCT/US2010/059867 filed on Dec. 10, 2010. --.

Signed and Sealed this
Fifteenth Day of September, 2015

Michelle K. Lee
*Director of the United States Patent and Trademark Office*